United States Patent Office 3,341,233
Patented Sept. 12, 1967

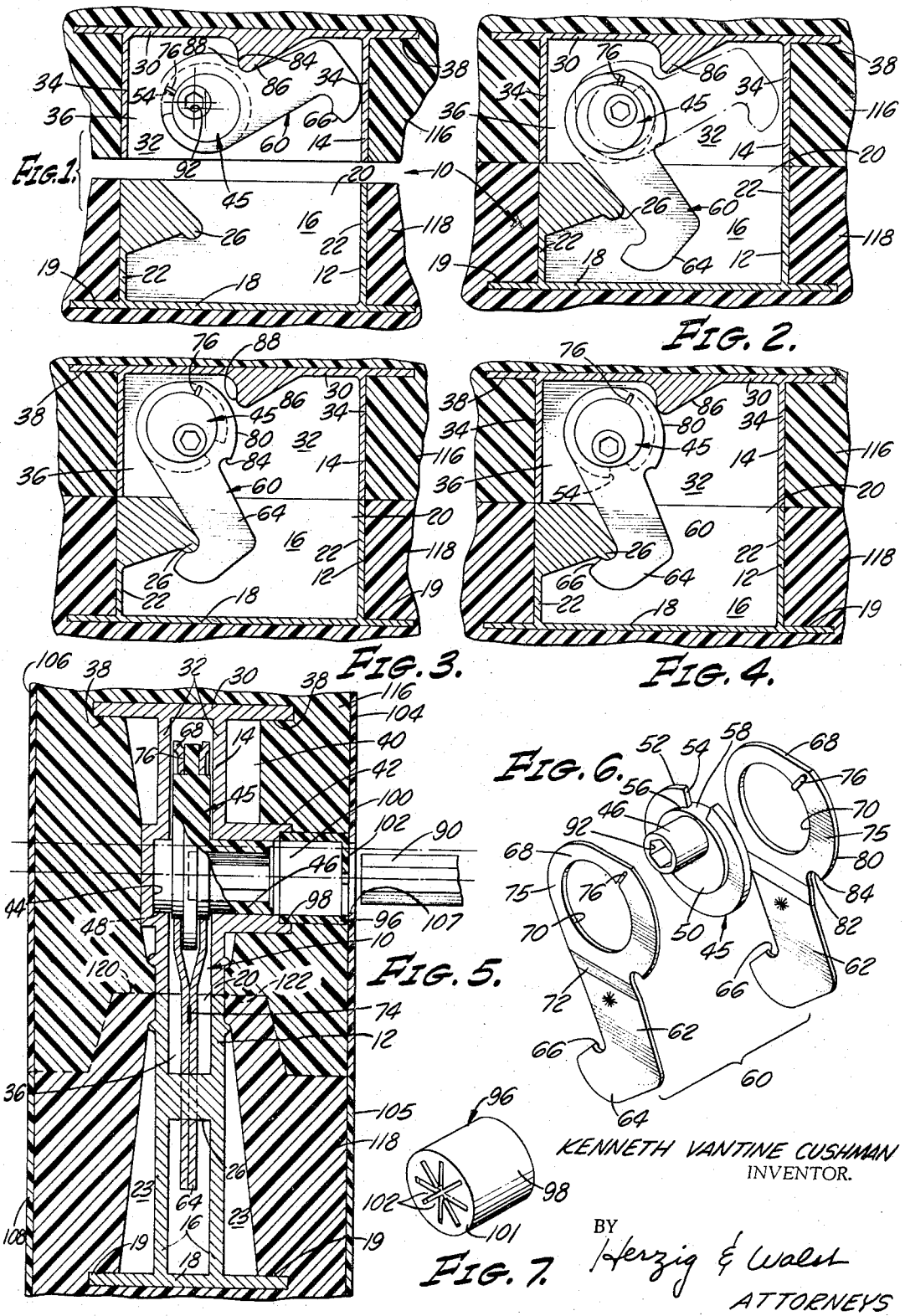

3,341,233
LOCKING MECHANISM
Kenneth Vantine Cushman, 2138 Salta St.,
Santa Ana, Calif. 92704
Filed Feb. 4, 1965, Ser. No. 430,394
6 Claims. (Cl. 287—20.924)

The present invention relates to a locking mechanism and more particularly to an improved locking mechanism of the type disclosed and claimed in Jones Patent No. 2,647,287.

The said Jones patent provides a locking mechanism which may be used in prefabricated structures such as knock-down refrigerator cabinets. The locking mechanism forms a permanent part of each wall member and it is capable of providing a secure joint after repeated use. Briefly stated, the locking mechanism disclosed in said Jones patent comprises a latch member carried in the joining surface of one of the walls. This latch member is adapted to be engaged by a hook-like locking member carried on the joining surface of another wall. The locking member is carried by an eccentric cam which provides the necessary movement for the locking member to effect engagement with the latch, and also to provide an over-center locking action with respect to the latch. The locking member is loosely mounted on the cam and a spring biased detent is mounted on the cam. The detent engages a slot provided in the locking member to aid in the locking and unlocking action. The cam is in the form of a short shaft which is rotatably mounted in a suitable casing. A compression spring encompasses the cam to bias the locking member into engagement with one side wall of the casing and a pin is rigidly affixed to the cam adjacent the other side wall of the casing. This pin is engageable with suitable abutments to control the action of the cam. The casing is cup-shaped and is adapted to be embedded in a recess provided in one of the walls for this purpose. The casing includes a flange which is engageable with the outer surface of the edge of the wall and the casing is secured to the wall by fastening means passing through apertures provided in the flange and engaging the edges of the wall.

While generally satisfactory, locking mechanisms of this type do have certain disadvantages.

One disadvantage resides in the fact that the cam structure and detent mechanism is comparatively expensive to manufacture, is difficult to assemble and prevents minimizing the width of the locking mechanism.

Another disadvantage resides in the fact that this type of locking mechanism does not provide a positive lock so that it sometimes becomes unlatched when subjected to vibrations.

Another disadvantage resides in the fact that the complete locking mechanism cannot be totally enclosed prior to installation to facilitate installation in foamed-in-place panels.

Yet another disadvantage resides in the fact that means are not provided for retaining the locking member in its retracted position leaving it free to rotate out of its bracket at will to an extended position where it can interfere with an abutting wall during the installation procedure.

In view of the foregoing factors and conditions characteristic of locking mechanisms for interlocking the joining surfaces of a pair of wall members, it is a primary object of the present invention to provide a new and useful mechanism not subject to the disadvantages enumerated above and having a locking member equally suited for use in conventional brackets or in a housing assembly especially designed for facilitating installation of the locking mechanism in foamed-in-place panels efficiently, safely and expeditiously.

Another object of the present invention is to provide a locking mechanism of the type described having a locking member of laminated construction which eliminates the need for compression spring detents.

Yet another object of the present invention is to provide a locking mechanism of the type described having an improved cam component which includes a thin, flanged surface extending beyond the actual cam face and which serves as a clutch plate surface when it co-acts with the laminated locking member of the present invention.

A further object of the present invention is to provide an improved latch and housing assembly for a locking mechanism of the type described.

A further object of the present invention is to provide a locking mechanism of the type described having a locking member and housing assembly designed to co-act in such a manner that the housing assembly not only prevents complete reciprocation of the locking member past its over-center locking position, but also acts as a carrier for the locking member when it is rotated to its retracted position.

According to the present invention, a totally enclosed locking mechanism is provided for interlocking the joining surfaces of a pair of panels or wall members. The locking mechanism includes two separate casings or housings. A new and useful latch of the present invention is mounted in one housing and a new and useful locking member and cam assembly of the present invention is rotatably mounted in the other housing. The locking member is designed in such a manner that it is engageable with an abutment provided in its housing to maintain the locking member in a retracted position. The locking member is also designed to bear against this abutment to maintain the locking mechanism in its locked position. Each housing includes a closed end forming a bracket and an open end. Each housing also includes an encompassing sidewall. The sidewall for one housing is provided with an aperture through which a standard hex wrench, or the like, may be inserted to actuate the locking member. If desired, the apertured housing may be incorporated in foamed-in-place panels during the formation of such panels when so used. An interchangeable, cylindrical tube having an open end and a frangible or rupturable end formed by segments is provided for insertion into the aperture in such a manner that the frangible end will prevent foaming material from passing through the tube and the aperture into the housing. The interchangeable tube may be supplied in different lengths to make it suitable for use with panels of different thicknesses. The manufacturer of formed-in-place panels forms an aperture in the panel skin in line with the predetermined location of the tube. After the panel is cured, the locking member may be actuated by rupturing the frangible end of the tube with the wrench employed to manipulate the locking member.

The locking member is of laminated construction wherein two halves are connected together in such a manner that a solid, hook-like member is formed at one end and a bifurcated member is formed at the other end. A cam and clutch plate assembly is rotatably mounted in the bifurcated end and each leg of the bifurcated end includes a detent. The clutch plate surface is cut away in a predetermined area to accommodate the detents. The bifurcated end creates a spring tension on both sides of the clutch plate. Spring tension in this position is limited to the pressure generated when the two halves were secured together. When the cam is rotated by means of standard hex wrench, or the like, the detents contact the solid section of the clutch plate thus further restricting slippage by increasing the amount of pressure required to expand the distance between the legs of the bifurcated member. This is an important feature of the invention because it minimizes the likelihood that the locking member can cycle before contacting its associated latch.

The center of rotation of the cam is off-set from the center of rotation of the locking member. Thus, when the locking member is rotated into engagement with the latch, further rotation of the cam causes the locking member to reciprocate or travel linearly. While many different degrees of travel will manifest themselves, the locking member shown herein for purposes of illustration, but not of limitation, travels ⅜ of an inch.

After the rotation thereof has been stopped by the latch and full lock-up travel accomplished, a few degrees of additional rotation is allowed to take place to obtain a positive lock. This forces the cam past the shortest distance between the pivot and latch point and positions the cam in this locked condition.

The vibration loads or tension pull-out loads will not induce the locking member to unlock unless an intentional wrench movement is introduced in an unlatching direction. Further rotation, or complete reciprocation, is restricted by the shape of the bifurcated member in the vicinity of the abutment provided in the locking member housing. This is accomplished by incorporating excess metal to form an arcuate-shaped enlargement at the bifurcated end. In addition, the bifurcated end of the locking mechanism is provided with a recess which is engageable with the abutment when the locking member is in its completely retracted position to prevent it from involuntarily rotating out of its associated housing at will where it will be in a position to interfere with the joining surface of another panel or wall member to be interlocked with the panel carrying the hook.

Although the housing assembly herein shown and described for purposes of illustration, but not of limitation, includes a bracket having a particular shape and location, it is to be understood that the bracket can be shaped and located to suit the particular needs of a particular installation.

Also, although the locking member may be advantageously made of steel and the cam and housing of a suitable plastic, it is to be understood that the various elements may be made of other materials. For example, the cam could be die-cast of aluminum or zinc base metals and the housing assembly could be manufactured from steel or aluminum with the locking member being made of a plastic material.

The features of the present invention which are believed to be novel are set forth with particularity in the appended claims. The present invention, both as to its organization and manner of operation, together with further objects and advantages thereof, may be understood by reference to the following description, taken in connection with the accompanying drawings in which like reference characters refer to like elements in the several views.

In the drawings:

FIGURE 1 is a cross-sectional view, with parts shown in elevation, of a totally enclosed locking mechanism of the present invention showing the locking member thereof locked in its retracted position;

FIGURE 2 is a cross-sectional view of the device of FIGURE 1 showing the locking member in different stages of travel from its fully retracted position toward locking engagement with its associated latch;

FIGURE 3 is a view similar to FIGURE 2 showing the locking member in initial engagement with its associated latch;

FIGURE 4 is a view similar to FIGURE 3 showing the locking member in locked engagement with its associated latch;

FIGURE 5 is a cross-sectional view showing the locking mechanism of FIGURE 1 in locking position within a pair of panels;

FIGURE 6 is an exploded perspective view on an enlarged scale of the locking member and cam of the locking mechanism of FIGURE 1; and FIGURE 7 is a perspective view of an interchangeable tube designed for use in combination with the locking mechanism of the invention.

Referring again to the drawings, a locking mechanism constituting a persently preferred embodiment of the invention, generally designated 10, includes a first casing or housing means 12 and a second casing or housing means 14. The first casing 12 includes a pair of parallel, spaced side walls 16, a bottom wall 18, an open top 20 and a pair of end walls 22. The bottom wall 18 is both wider and longer than the remaining portion of the housing 12, thereby forming a bracket 19 for a purpose to be hereinafter described. A plurality of thin web-like members or gusset plates 23 are provided along bracket 19 for connecting to an associated side wall 16. A latch means 26 is mounted on one end wall 22 in the housing 12.

The second housing 14 includes a bottom wall 30, a pair of spaced parallel side walls 32, a pair of end walls 34 and an open top 36. The bottom wall 30 is similar in shape to the bottom wall 18 and includes a bracket 38 which is connected to an associated side wall 32 by thin web-like members 40. One side wall 32 is provided with a journal 42 and the other side wall 32 is provided with a cylindrical recess 44 forming journal means in which a rotatably driven member or cam assembly 45 is rotatably mounted by a first hub 46 and a second hub 48 respectively.

The rotatably driven member 45 includes a cylindrical cam 50 which is partially encompassed by a clutch plate 52 in such a manner that its ends 54 are spaced apart to form a cut-out portion. The hubs 46 and 48 are mounted on opposite faces of the cam 50 and have common axes of rotation off-set from the axis of rotation of the cam. The clutch plate 52 is thinner than the cam 50 thereby forming annular shoulders 56 and 58 (FIGURE 6) on the cam.

A laminated locking member 60 is rotatably mounted in the housing 14 on the shoulders 56 and 58 and includes a pair of hook-like members 62 each having a first end 64 formed with a hook 66 and a second end 68 provided with an aperture 70. The ends 68 are off-set from their associated ends 64, as indicated at 72, so that, when the ends 64 are joined together by means of a suitable weldment, such as the one shown at 74 in FIGURE 5, the ends 64 will form a solid hook member and the ends 68 will form the legs 75 of a bifurcated member. The locking member 60 is preferably made from a suitable resilient material, such as steel. The driven member 45 is rotatably mounted between the legs 75 with the shoulder 56 being disposed within one aperture 70 and the shoulder 58 being disposed within the other aperture 70. The thickness of the plate 52 is sufficiently thicker than the distance between the legs 75 so that spring tension or pressure is exerted on the plate 52 by the legs 75. A protuberance or detent 76 is provided on the inside of each leg 75 and is so positioned that each of them will be normally disposed between the ends 54 of the plate 52. The plate 52 is formed integrally with the cam 50 so that the rotation of the cam 50 will also rotate the locking member 60 through engagement of the detents 76 with an applicable edge 54. However, should continued rotation of the locking member 60 be blocked, the detent 76 will ride up on the faces of the clutch plate 52 permitting further rotation of the cam 50. Each end 68 of the locking member 60 also includes an arcuate portion 80 extending beyond the normal periphery of its associated end 68 and merging into a recess 82 forming a small hook 84. An abutment means 86 is also mounted in housing 14 and includes a hook portion 88 which lies in the path of travel of the arcuate portion 80 and the hook 84.

After the driven member 45 and its associated member 60 have been mounted in the housing 14, a hexagonally shaped key 90 (FIGURE 5) may be inserted into a hexagonally shaped recess 92 provided in the hub 46 and rotated in a counterclockwise direction, as viewed in FIG- URE 1. This rotates the locking member 60 in such a manner that the hook 84 engages the abutment 86 to retain the member 60 in its fully retracted position within the housing 14. This is an important feature of the invention because it prevents the locking member 60 from extending through the open end 36 of housing 14 to interfere with the positioning of a first panel carrying the housing 14 in abutting relation with a second panel carrying the housing 12 during panel-locking operations.

The locking mechanism 10 may be used in combination with many different types of panels for the purpose of locking two panels together. When used in foamed-in-place panels such as the ones shown at 116 and 118 it is desirable to place the housings 12 and 14 in the mold before the panels are formed. During the foaming operation, material may be prevented from entering the housing 14 through the open journal 42 by inserting an interchangeable tube 96 into the journal 42. The tube 96 may be supplied in various lengths to accommodate it to various panel thicknesses and functions as a part of the totally enclosed locking mechanism 10, as will become hereinafter apparent. The tube 96 includes an encompassing sidewall 98, an open end 100 and a frangible end 101 formed by segments 102. When the housing 14 is positioned between suitable panel skins 104 and 106 before the panel 116 is formed, the tube 96 is of sufficient length to extend from the journal 42 to the skin 104 with the segments 102 lying adjacent to and in alignment with an aperture 107 provided in the skin 104.

The housing 12 may be placed between the panel skins 105 and 108 before the panel 118 is formed. The panels 116 and 118 include edges 122 and 120, respectively, which are adapted to abut each other with a tongue-and-groove fit and with the open ends of their associated housings 12–14 abutting each other so that the locking member 60 may be extended through the open end of housing 14 into the open end of housing 12 by employing the key 90 to rupture segments 102 and manipulate the locking member 60.

Operation of the locking mechanism of the present invention will be readily understood.

When the locking member 60 is in its FIGURE 1 position, the detents 76 abut the upper edge 54 of the clutch plate 52. In this position, the relationship of the axis of rotation of the hub 46 with respect to the axis of rotation of the cam 50 is such that clockwise rotation of the driven member 45 will cause the hook 84 on member 60 to move downwardly and to the left out of engagement with the hook 88, to the position shown in phantom lines in FIGURE 2. The member 60 is now free to travel with the member 45. Continued clockwise rotation of the member 45 causes the end 64 of member 60 to abut the latch 26, as shown in FIGURE 2. This prevents further rotation of the member 60 causing the detents 76 to ride up onto the faces of the clutch plate 52 so that the cam 50 is then rotating with respect to the member 60 in such a manner that a linear travel is imparted thereto, in the direction of latch 26, by virtue of the off-set nature of the axis of rotation of the hub 46 and the axis of rotation of the member 60. The latch 25 then prevents the end 64 of the member 60 from either rotating or moving linearly so that continued clockwise rotation of the member 45 causes the end 68 of the member 60 to swing to the right (as viewed in FIGURE 4) into engagement with the abutment 86 which contacts the arcuate portion 80 and prevents further movement of the end 68. This locks the member 60 and prevents it from becoming unlatched by vibrations and the like. This locking is effectuated by forcing the cam 50 past its over-center position. Thus, further rotation, or complete reciprocation, is restricted by the abutment of the arcuate portion 80 against the stop member 86.

When the member 60 is in its FIGURE 4 position, counterclockwise rotations of the member 45 will swing the end 68 to the left, as viewed in FIGURE 4. Simultaneously, the end 64 will move linearly out of engagement with the latch 26 whereupon the member 60 is free to swing up to its FIGURE 1 position.

While the particular locking mechanism herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A locking mechanism comprising:
   a latch;
   a member formed with hook means at one end and spaced-apart parallel legs at its other end, said hook means being adapted to engage said latch;
   a rotatably driven member rotatably mounted between said legs, said rotatably driven member having an eccentric axis of rotation forming a rotatable support for said locking member and being adapted for rotation on an eccentric axis through an over-center position, with respect to said latch for moving said locking member into locking relationship with said latch; and
   a detent carried by at least one of said legs and being engageable with said rotatably driven member to form a driving connection, said detent releasing said rotatably driven member when said locking member engages said latch thereby permitting continued movement of said rotatably driven member through its over-center position with respect to said latch, said one leg being axially flexible to flex away said rotatable member to release said detent.

2. A locking mechanism comprising:
   a latch means;
   a locking member having hook means at one end for engaging said latch means and contining apertured, parallel, spaced-apart legs at its other end;
   a cam formed with an eccentric axis of rotation extending through said apertures in said spaced-apart legs and being adapted to eccentrically move said locking member into engagement with said latch and, on continued rotation, passing through an over-center position with respect to said latch to interlock the locking member with the latch; and
   a detent carried by each of said legs and being engageable with said cam for forming a driving connection which is released by the spreading apart of said legs when said locking member engages said latch permitting said cam to continue to move through its over-center, locked position.

3. A locking mechanism comprising:
   a latch;
   a locking member having a hook at one end for engaging said latch and having parallel, spaced-apart apertured legs at its other end;
   a rotatably driven member formed with an eccentric axis of rotation extending through said apertures in said legs and adapted to eccentrically move said locking member into engagement with said latch and, on continued rotation, passing through an over-center position with respect to said latch to interlock the locking member with said latch, said rotatably driven member including a clutch plate encompassing said eccentric axis of rotation; and
   a detent carried by at least one of said legs and being engageable with said clutch plate to form a driving connection which is released when said locking number engages said latch permitting said rotatably driven member to continue to move through its over-center locked position, said one leg being axially flexible to flex away from said rotatable member to release said detent.

4. In combination with a pair of panels each having a joining surface co-operable with the joining surface of the other panel to form a junction between said panels:

a first housing mounted within the joining surface of one of said panels;

a latch member mounted in said first housing;

a second housing mounted within the joining surface of the other of said panels;

a locking member mounted within the said second housing, said locking member having a first hook-shaped portion adapted to extend beyond the plane of the joining surface and engage said latch, said locking member also having a second hook-shaped portion;

a cam having an eccentric axis of rotation carried within said second housing and forming a support for one end of said locking member, said cam being adapted for rotation through an over-center position with respect to said latch;

a hook-shaped abutment means mounted in said second housing in the path of travel of said second hook-shaped portion for suspending said locking member in an inoperative position within said second housing;

an arcuate member formed on said locking member; detent means carried by said locking member and being engageable with the said cam to form a driving connection and for releasing said cam when said locking member engages said latch permitting continued movement of said cam through its over-center position with respect to said latch, said arcuate member being positioned to engage said hook-shaped abutment to restrain further movement of said locking member.

5. The combination of claim 4 including bracket means on each of said housing for retaining them in position within said joining surfaces.

6. A locking mechanism comprising: a first housing means having a closed bottom wall, a pair of parallel, spaced-apart end walls and an open top, one of said side walls being provided with a journal forming an opening in said one side wall; a second housing means having a closed bottom wall, a pair of parallel, spaced-apart end walls and an open top, said open top of said second housing means corresponding in size and shape to said open top of said first housing means; a latch mounted in said second housing; a locking member formed with a hook for engaging said latch; a rotatably driven member rotatably mounted in said journal, said rotatably driven member including a wrenching recess accessible through said opening, said rotatably driven member having an eccentric axis of rotation forming a rotatable support for said locking member, said driven member being adapted for rotation on an eccentric axis through an over-center position with respect to said latch for moving said locking member into locking relationship with said latch when said open tops are placed in abutting relationship; and clutch means carried by one of said members and being engageable with the other member to form a driving connection and releasing said members when said locking members engage said latch permitting continued movement of said driving member through its over-center position with respect to said latch, said locking member including spaced apart parallel legs between which said rotatably driven member is rotatably mounted and wherein said clutch means comprises a detent carried by at least one of said legs and being engageable with said rotatably driven member to form a driving connection, said one leg being axially flexible to flex away from said rotatable member to release said detent, said detent releasing said rotatably driven member when said locking member engages said latch, thereby permitting continued movement of said rotatably driven member through its over-center position with respect to said latch.

References Cited

UNITED STATES PATENTS

| | | | |
|---|---|---|---|
| 2,486,686 | 11/1949 | Shreve | 292—111 |
| 2,647,287 | 8/1953 | Jones | 287—20.92.4 |
| 2,714,751 | 8/1955 | Stuart | 287—20.92.4 |
| 2,738,211 | 3/1956 | Schlueter | 292—111 |
| 2,741,341 | 4/1956 | Anderson | 52—578 |
| 3,191,244 | 6/1965 | Burke | 287—20.92.4 |

FRANK L. ABBOTT, *Primary Examiner.*

R. A. STENZEL, *Assistant Examiner.*